United States Patent [19]

Moskovich

[11] Patent Number: 4,682,862

[45] Date of Patent: Jul. 28, 1987

[54] PROJECTION LENS
[75] Inventor: Jacob Moskovich, Cincinnati, Ohio
[73] Assignee: U.S. Precision Lens Incorporated, Cincinnati, Ohio
[21] Appl. No.: 899,477
[22] Filed: Aug. 22, 1986

Related U.S. Application Data

[63] Continuation-in-part of Ser. No. 820,553, Jan. 17, 1986.
[51] Int. Cl.[4] .................. G02B 13/18; G02B 9/34; G02B 9/60; G02B 9/62
[52] U.S. Cl. ..................... 350/432; 350/412; 350/464; 350/465; 350/469
[58] Field of Search ............. 350/412, 432, 469, 481, 350/464, 465

[56] References Cited

U.S. PATENT DOCUMENTS

| | | | |
|---|---|---|---|
| 2,417,330 | 3/1947 | Strang | 350/481 |
| 2,440,088 | 4/1948 | Grey | 350/453 |
| 2,468,564 | 4/1949 | Luneburg | 350/432 |
| 2,479,907 | 8/1949 | Cox | 350/432 |
| 2,502,543 | 4/1950 | Warmisham | 350/432 |
| 2,552,672 | 5/1951 | Grey | 350/432 |
| 2,638,034 | 5/1953 | Wreathall | 350/432 |
| 2,660,094 | 11/1953 | Wreathall | 350/432 |
| 2,737,849 | 3/1956 | Tiller | 350/469 |
| 2,865,253 | 12/1958 | Thielens | 350/481 |
| 3,429,997 | 2/1969 | Rosner et al. | 350/438 |
| 3,567,304 | 3/1971 | Kruger | 350/481 |
| 3,778,133 | 12/1973 | Tatian | 350/432 |
| 3,800,085 | 3/1974 | Ambats et al. | 350/420 |
| 3,817,604 | 6/1974 | Watt | 350/481 |
| 3,868,173 | 2/1975 | Miles et al. | 350/432 |
| 3,951,523 | 4/1976 | Nishimoto | 350/432 |
| 3,980,399 | 9/1976 | Howden | 350/432 |
| 3,998,527 | 12/1976 | Ikeda et al. | 350/432 |
| 4,099,848 | 7/1978 | Osakabe | 350/432 |
| 4,181,409 | 1/1980 | Whitney et al. | 350/432 |
| 4,240,701 | 12/1980 | Lytle | 350/432 |
| 4,300,817 | 11/1981 | Betensky | 350/412 |
| 4,348,081 | 9/1982 | Betensky | 350/412 |
| 4,397,520 | 8/1983 | Neil | 350/481 |
| 4,474,437 | 10/1984 | Goranstein | 350/432 |
| 4,479,695 | 10/1984 | Neil | 350/432 |
| 4,530,575 | 7/1985 | Yamakawa et al. | 350/432 |
| 4,548,480 | 10/1985 | Yamamoto et al. | 350/432 |
| 4,561,736 | 12/1985 | Furter et al. | 350/432 |
| 4,564,269 | 1/1986 | Uejara | 350/432 |
| 4,577,935 | 3/1986 | Yamakawa et al. | 350/432 |
| 4,595,263 | 6/1986 | Clarke | 350/432 |
| 4,603,950 | 8/1986 | Uehara et al. | 350/432 |

FOREIGN PATENT DOCUMENTS

| | | |
|---|---|---|
| 57-101812 | 6/1982 | Japan . |
| 57-108815 | 7/1982 | Japan . |
| 57-108818 | 7/1982 | Japan . |
| 57-177115 | 10/1982 | Japan . |
| 58-118616 | 7/1983 | Japan . |
| 58-125007 | 7/1983 | Japan . |
| 58-139110 | 8/1983 | Japan . |
| 58-139111 | 8/1983 | Japan . |
| 58-140708 | 8/1983 | Japan . |
| 59-121016 | 7/1984 | Japan . |
| 59-133517 | 7/1984 | Japan . |
| 59-133518 | 7/1984 | Japan . |
| 593514 | 10/1947 | United Kingdom . |
| 1269133 | 4/1972 | United Kingdom . |

OTHER PUBLICATIONS

Printed Publication–Diagram of a Lens entitled, Advent Lens Mod II.
Printed Publication–pp. 470–482 of a Volume entitled, A System of Optical Design, by Cox.

*Primary Examiner*—John K. Corbin
*Assistant Examiner*—Scott J. Sugarman
*Attorney, Agent, or Firm*—Costas, Montgomery & Dorman

[57] ABSTRACT

A projection lens system adapted to project an image from a cathode ray tube and consisting from the image end of a first lens unit of weak optical power, a second lens unit of strong optical power including a biconvex glass element, a third lens unit of strongly negative optical power having a convex image side surface and serving as a field flattener, the first lens unit consisting of a first meniscus shaped element having positive power at the optical axis having at least one aspheric surface and being convex to the image, and a second meniscus shaped element having at least one aspheric surface, the said second meniscus being convex to the second lens group and closely spaced thereto. The second meniscus may be on either side of the second lens unit and is of very weak optical power.

42 Claims, 6 Drawing Figures

PROJECTION LENS

RELATED APPLICATIONS

This application is a continuation-in-part of application Ser. No. 820,553 filed Jan. 17, 1986.

FIELD OF THE INVENTION

This invention relates to projection lenses, and more particularly, relates to projection lenses for cathode ray tubes (CRT) and wide screen television.

BACKGROUND OF THE INVENTION

A preferred form of projection lenses for wide screen television is disclosed in U.S. Pat. Nos. 4,300,817, 4,348,081, and 4,526,442, all assigned to the assignee of the present application.

In these previous patents, the lens units have been referred to as groups which perform specified optical functions. However, in accordance with present U.S. Patent and Trademark Office requirements, the overall lens will be defined in terms of "lens units". It will be understood that the term "units" refers to one or more optical elements or components air spaced from another optical unit.

It is well known that a specified optical function(s) of a lens unit or group in an overall lens may be accomplished by using one element or component or more than one element or component dependent upon the correction or function desired. A decision as to whether one or more elements is used as a lens unit in an overall lens design may be based on various considerations, including but not limited to, ultimate performance of the lens, ultimate costs of the lens, acceptable size of the lens, etc. Accordingly, in the following specification and appended claims, the term "lens unit" refers to one or more lens elements or lens components which provide a defined optical function or functions in the design of the overall lens.

The lenses disclosed in the aforementioned patents generally comprise three lens units: from the image end a first lens unit, having at least one aspheric surface, which serves as an aberration corrector; a second lens unit including a biconvex element which supplies all or substantially all of the positive power of the lens; and a third lens unit having a concave surface towards the image end of the lens, serving as a field flattener, and essentially correcting Petzval curvature of the first and/or second groups.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of one hundred twenty-seven millimeters or greater, while the lenses of U.S. Pat. No. 4,348,081, which utilize a two-element second lens unit, including the biconvex element, may have an EFL reduced to eighty-five millimeters as designed for direct projection for a five inch diagonal CRT. The lenses described in U.S. Pat. No. 4,526,442 are designed to have a fold in the optical axis between the first and second lens units and have been designed so that the EFL is as low as one hundred twenty-six millimeters. These EFL's are also for CRT screens having a viewing surface with an approximate five inch diagonal.

Projection TV sets are rather bulky and have required high volume cabinets. One manner of reducing the cabinet size is to decrease the EFL of the projection lenses.

The EFL of the lens is a function of the total conjugate distance between the CRT and the display screen. This is shown by the relationship:

$$OL = EFL(1 + 1/M) + EFL(1 + M)$$

where

OL is the overall conjugate distance of the system from object to image

EFL (1 + M) is the distance from the image to the first principal point of the lens EFL (1 + 1/M) is the distance from the object to the second principal point of the lens and M is the magnification of the system expressed as the ratio of object height to image height.

Therefore, in order to decrease the total distance between the CRT and the screen, it is necessary to reduce the EFL. This, of course, increases the field angle of the lens, if that lens is to be used at the same magnification.

An effect of increasing the angular coverage of the lens as a result of decreasing the EFL is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, a better control of aberrations can be obtained for a shorter EFL. However, merely splitting the optical power of the second lens unit into two elements to obtain additional degrees of optical design freedom does not provide acceptable contrast and resolution where the angular coverage of the projection lenses is required to be in excess of twenty-seven degrees, semi-field.

A further consideration is introduced wherein a spacing is provided between the phosphor screen of the CRT and the third lens unit of the projection lens. This spacing may be required for the inclusion of a liquid cooling and/or optical coupling material and a housing necessary to enclose the coolant against the face of the CRT. This additional spacing between the face of the CRT causes the third negative lens unit to contribute more negative power, which must be compensated by increased power in the positive second lens unit.

Projection lens of the overall type described have been designed with decreased EFL's by designing a more complex second lens unit split into more than one lens element, as exemplified in the lenses disclosed in co-pending Applications Ser. Nos. 642,825 and 652,062, issued Aug. 21, 1984 and Sept. 19, 1984, respectively.

These designs are currently used on many wide screen projection television sets and may have an equivalent focal length as low as eighty millimeters.

Co-pending application Ser. No. 776,140, filed Sept. 13, 1985, discloses projection lenses in which the EFL is reduced to less than sixty millimeters for an object height of approximately five inches.

These lenses use a negative first lens unit to aid in correction of field curvature due to the large positive power of the second lens unit and increased field angle. This approach works very well and leads to high quality optical performance of the lens. However, it requires large diameter positive elements in the second lens unit to accommodate the diverging bundle of light (as traced from the long conjugate). This construction also requires a lens of relatively long front vertex distance (FVD) largely due to a long space between the first negative element and the following power unit necessary to achieve an appropriate correction of the field curvature and astigmatism. The front vertex distance is the distance from the image side of the first lens unit to the face place of the CRT.

The related co-pending application Ser. No. 820,553 discloses a lens of the type described, which consists of a first lens unit which comprises a single element with two aspheric surfaces, and an overall positive meniscus shape preferably convex to the image end, a second positive element, and a third lens unit having a strongly negative surface concave to the image end. The first lens element is of positive optical power at the optical axis of the lens, but due to the aspheric power of the surfaces, the positive optical power decreases with distance from the optical axis until it become strongly negative at or closely adjacent the clear aperture of the first lens element, as hereinafter explained.

The strong negative power of the third lens unit contributes to correction of the Petzval sum of the other lens elements. The strongly concave surface may be made aspheric to also correct for residual astigmatism and field curvature of the lens. The second lens element provides the majority of the positive power of the lens and some correction for astigmatism. The first lens element must then correct the aperture dependent aberrations, particularly, spherical and coma. Lenses as described in the related co-pending application are very compact, having the first and second lens units spaced more closely than heretofore. Lenses as described may have a field angle as great as 73° while comprising only three elements.

In lenses described in U.S. Pat. No. 4,300,817 and the co-pending applications, the power unit elements are often made out of acrylic because of simplicity of manufacturing aspherical surfaces on plastic. However, the refractive index of acrylic varies significantly with the change of temperature. As a result, the focal length of the lens where all the elements are made out of acrylic may vary quite substantially with the change of operating temperature leading to a change of focus and to the degradation of image quality. One way to compensate for the focus shift with temperature is to design a lens mount and a lens barrel using, possibly, a bi-metallic plate or other means that will shift the position of the lens relative to CRT as a function of temperature in such a way that the focus of the lens will remain in a constant position.

Another way of solving the problem of thermal focus shift is to make the power group out of glass because the index of refraction of glass is much more stable with the change of temperature. Consequently, the power of the lens will not be changing by very much and the same will be true for a position of the focus of the lens. However, since making aspherical surfaces on glass is currently much more expensive than on plastic, the reasons of economics limit this glass power unit to having only spherical surfaces. With this limitation, it becomes very difficult to obtain a good optical performance of the lens while, at the same time, maintaining a simple configuration of that lens and still be capable of handling high speed and wide field coverage.

The present invention provides a projection lens for projecting a monochromatic CRT onto a larger screen, the lens capable of handling a high speed of at least f/1.0; providing a wide field of view in excess of 30 degrees and up to 45 degrees; exhibiting very little focus shift and image quality degradation with the change of operating temperature at which this lens is used; being manufactured very economically and in large numbers using conventional technology; and delivering a high image quality.

SUMMARY OF THE INVENTION

Briefly stated, the invention in one form thereof, from the image end consists of a first lens unit of weak optical power comprising in one form of the invention a positive meniscus having at least one aspheric surface. Following is a lens unit of overall biconvex shape which may have spherical surfaces and may consist of a single element or two elements if the power of the second lens unit is to be split. This lens unit supplies the majority of the optical power of the lens and it is sometimes referred to as the power lens unit. Closely spaced to the second power lens unit is a meniscus of weak optical power convex to the power lens unit. This element contributes to correction of sagittal oblique spherical aberration. A third lens unit, which may be optically coupled to the CRT, includes a stongly concave image side surface and serves as a field flattener to contribute to the correction of any Petzval curvature of the other lens units. In some embodiments of the invention, a corrector lens unit of relatively weak optical power is positioned between the second and third lens units at a distance which permits contribution to correction of aperture dependent aberrations, and also permits the lens designer to utilize the outer dimensions to correct for the aberrations due to off-axis rays. At least one surface in this corrector is aspherical.

This corrector unit becomes particularly important to use when the field of view of the lens becomes larger than about 30°, and the correction of residual astigmatism, sagittal oblique spherical and coma, becomes more important due to their increased size as a function of the increased field of view of the lens. In the first lens unit, the first lens element is usually weak positive element of the generally meniscus shape convex to the long conjugate. The positive power is important so that the axial ray bundle following that element is converging to keep a minimal size of the second power lens unit. It also permits a favorable correction of residual field curvature and astigmatism since there is a relatively small separation between that first element and the power group. This provides for a shorter physical length and the smaller size of that lens.

The meniscus convex to the power lens unit permits a better correction of sagittal oblique spherical aberration. The first lens unit as a whole including the meniscus conves to the power lens unit has a weak optical power. It must have at least one aspherical surface, and in addition to correcting for sagittal oblique spherical, this unit carries the main burden of correction of aperture dependent aberrations, spherical and coma, and it also provides for some correction of distortion.

Lenses embodying the invention designed for a forty inch diagonal projection television set may have a semifield angle of over 43° and an EFL as low as 52.3 mm and a front vertex distance of only 87.1 mm.

An object of this invention is to provide a new and improved projection lens of the type described, having a wider field angle.

Another object of this invention is to provide a more compact lens of the type described.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
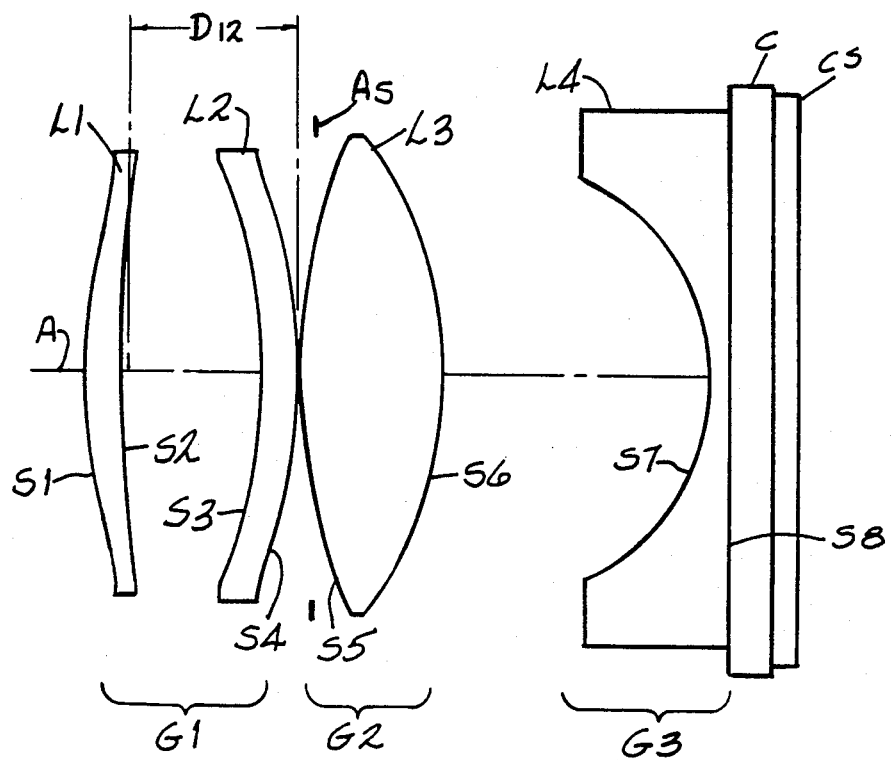
FIGS. 1-6 are schematic side elevations of lenses embodying the invention.

Different projection lenses embodying the invention are set forth in Tables I-VIII and exemplified in the drawings.

Figure 2:
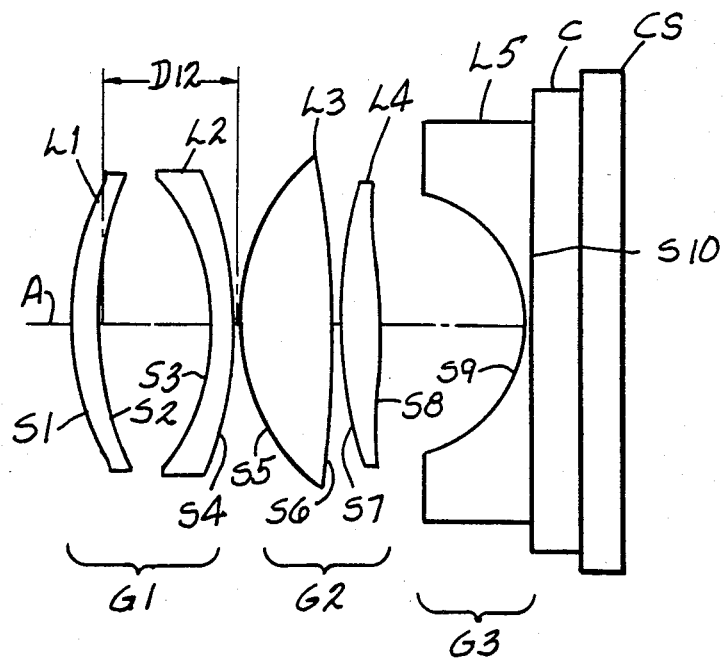
Figure 3:
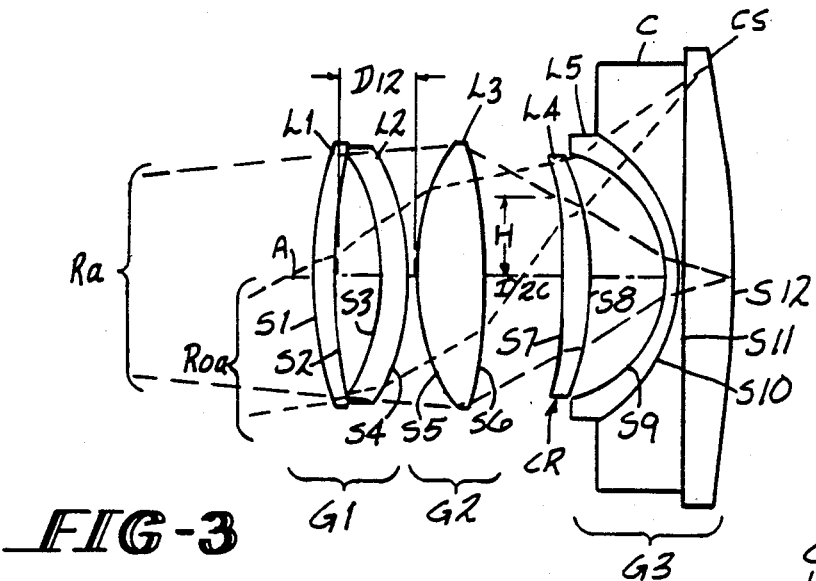

In the drawings, the lens units are identified by the reference G followed by successive arabic numerals; lens elements are identified by the reference L followed by successive arabic numerals from the image to the object end. Surfaces of the lens elements are identified by the reference S followed by successive arabic numerals from the image to the object end. The reference SC denotes the screen of a cathode ray tube while the reference C denotes a liquid optical coupler between the screen SC and the overall lens. In the embodiments of FIGS. 2 and 3, the coupler C contributes optical power as hereinafter explained.

In all disclosed embodiments of the invention, the first lens unit G1 includes an overall positive shaped meniscus and has at least one aspheric surface defined by the equation $$x = \frac{Cy^2}{1 + \sqrt{1 - (1 + K)C^2 y^2}} + Dy^4 + Ey^6 + Fy^8 + Gy^{10} + Hy^{12} + Iy^{14}$$

where x is the surface sag at a semi-aperture distance y from the axis A of the lens, C is the curvature of a lens surface at the optical axis A equal to the reciprocal of the radius at the optical axis, K is a conic constant, and D, E, F, G, H and I are aspheric coefficients of correspondingly 4th through 14th order.

The second lens unit G2 is biconvex and preferably consists of a single biconvex element L3 having spherical surfaces, and is made of a glass material.

The third lens unit G3 in all embodiments acts as a field flattener, that is, corrects any Petzval curvature of the first and second lens units. The concave image side surface of the third lens unit G3 may be spherical or aspheric, as hereinafter described. As disclosed in co-pending application Ser. Nos. 820,553 filed Jan. 17, 1986, the spacing $D_{12}$ between the first element of the first lens unit and lens unit G2 is important in aiding in the correction of field curvature, and converging rays to the biconvex lens unit. The spacing $D_{12}$ between the first element of the first lens unit and the second lens unit should be $$0.12 < |D_{12}/F_3| < 0.6$$

where $F_3$ is the equivalent focal length of the third lens unit.

If $|D_{12}/F_3|$ goes below 0.12, the field curvature becomes overcorrected and the image quality becomes unacceptable. If $|D_{12}/F_3|$ exceeds 0.6, the field curvature is undercorrected and the image quality is again not acceptable.

FIG. 1 exemplifies a lens as disclosed in co-pending application Ser. No. 899,543, filed on the same day as this application, in which the first lens unit G1 includes a second element L2 which is a weak meniscus closely spaced to the lens unit G2 and convex thereto. The axial spacing between L2 and L3 as shown in FIGS. 1-6 is less than 0.1 of the EFL of the lens, the highest spacing being 0.96 as set forth in Table IV herein.

This lens is shown for use with a flat CRT faceplate SC and therefore requires a greater degree of curvature on surface S7 of element L4 for correction of field curvature. The greater the field angle of the lens and the stronger the negative power of the concave surface S7, the greater the amount of sagittal oblique spherical aberration that will be introduced. This is corrected by a meniscus corrector lens unit L2, as shown in FIG. 1, which is concave to the image. Thus, the shape and function of element L2 in FIG. 1 is to contribute to correction of sagittal oblique spherical aberration. Element L2 is of very weak positive power and could go to weak negative power. A lens as shown in FIG. 1 is substantially described in Table I.

The size of both elements in the first group is determined by the size of the axial ray bundle and, consequently, this unit carries most of the burden of correction for the aperture dependent aberrations.

FIG. 2 exemplifies another lens embodying the invention, where lens unit G2 comprises two lens elements L3 and L4. In FIG. 2, surface S9 is aspherical, as is at least one surface of each of elements L1 and L2 in lens unit G1.

Reference is now made to FIG. 3 which shows a ray trace from the long conjugate side of axial rays $R_A$ and off-axis rays $R_{OA}$ in a lens embodying the invention. A lens shown in this figure and described in Table IV has a field of view of 38 degrees. To achieve a high level of image quality for such a wide field coverage, a corrector unit is introduced between the power unit G2 and the field flattener G3. As mentioned before, the function of this corrector is, on one hand, to correct for the residual field dependent aberrations like sagittal oblique spherical, astigmatism and coma, and on the other hand, some of the correction of the aperture dependent residual spherical aberration is also accomplished through the appropriate positioning and bending of this corrector unit.

The spacing $D_{2C}$ between the second lens unit G2 and corrector lens unit CR is $$0.4 > D_{2C}/F_0 > 0.15$$

where $F_0$ is the equivalent focal length of the overall lens.

If $D_{2C}$ becomes too large, the ability to correct aperture dependent aberrations is lost because the height of the axial ray bundle $R_A$ becomes too low.

If $D_{2C}$ becomes too small, H increases, and the ability to influence off-axis aberrations is decreased.

Figure 4:
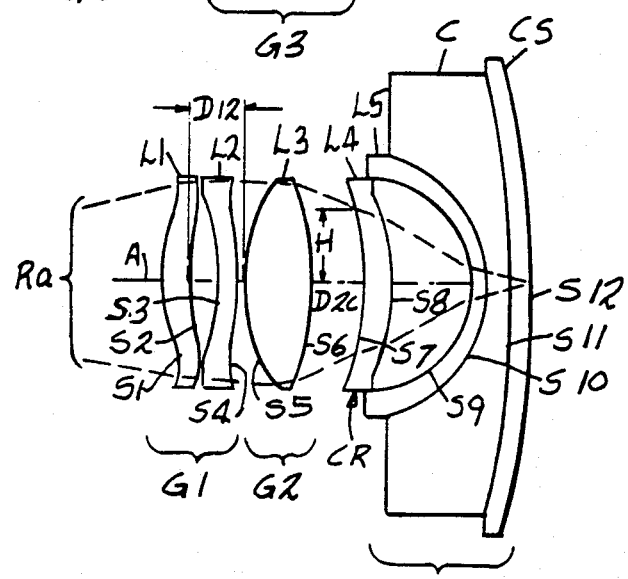
Figure 5:
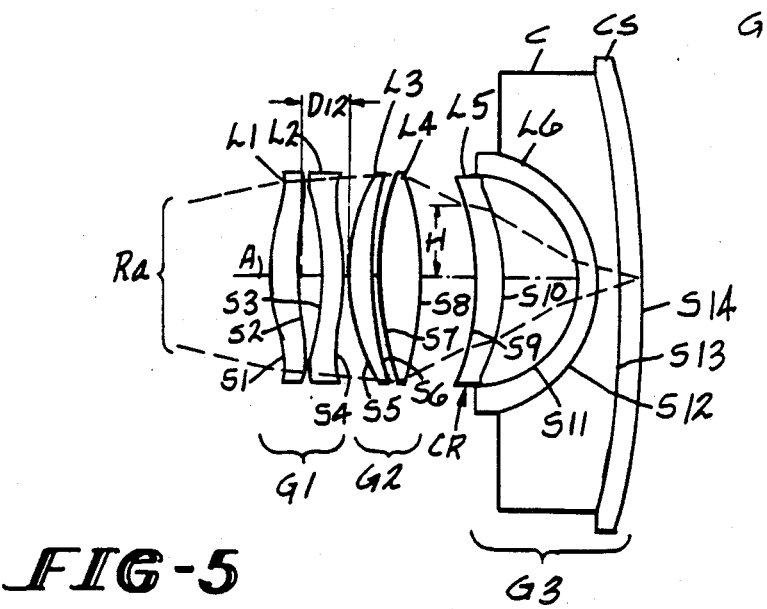

The lens of FIG. 3 is designed for a CRT screen CS which is convex on its phosphor side and contributes positive optical power to lens unit G3. This reduces the curvature of surface S9. The lens of FIGS. 3-5 are optically coupled to the faceplate of the CRT by a liquid in coupling housing C, as disclosed in co-pending Application Ser. No. 820,266 filed Jan. 7, 1986.

FIG. 4 exemplifies an additional embodiment of the invention. Two lenses as shown in FIG. 4 are substantially described in Tables V and VI, respectively.

FIG. 5 exemplifies a further embodiment of the invention where the second lens element G2 is split into two elements L3 and L4 to avoid too much power in one element and resultant aberrations. The CRT faceplate CS is of meniscus shape convex to the phosphor side. This aids in decreasing the power of the third lens unit. However, in view of the large field angle of this lens (almost 44° semi-field), lens element L2 is provided to contribute to correction of sagittal oblique spherical aberration. A lens, as shown in FIG. 5, is substantially described in Table VII.

Figure 6:
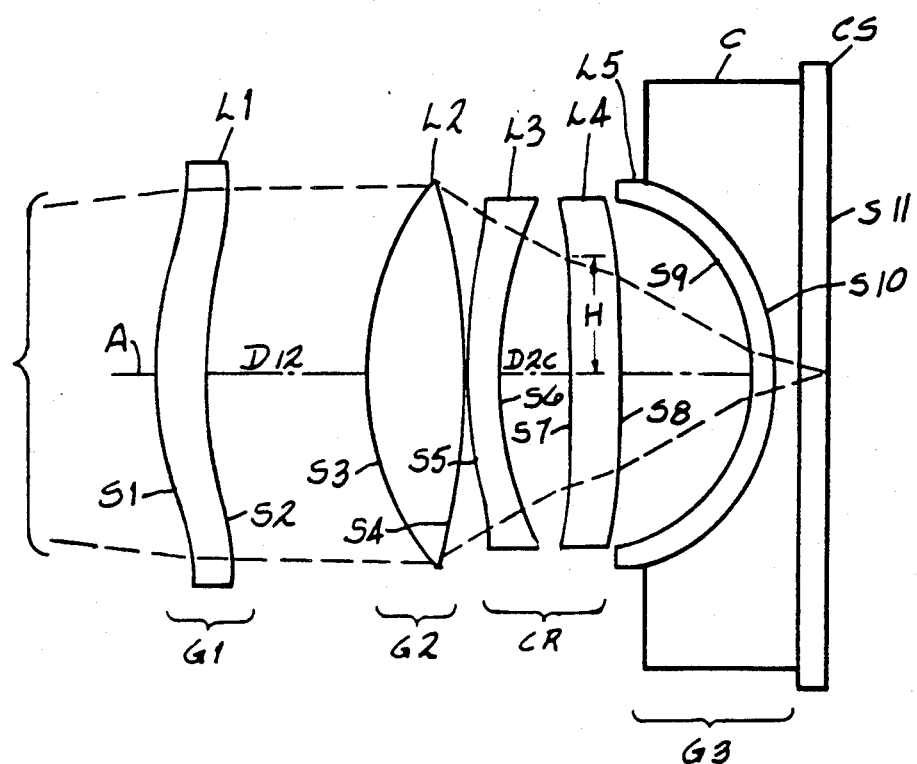

FIG. 6 exemplifies another lens embodying the invention and the meniscus corrector convex to lens unit G2 is closely spaced on the object side of lens unit G2. Here it is shown as element L3. A lens as shown in FIG. 6 is substantially described in Table VIII.

In all cases, the spacing of the meniscus corrector from the second lens unit G2 is less than one percent of the EFL of the lens.

In the following tables, the lens elements are identified from the image end to the object end by the reference L followed successively by an arabic numeral. Lens surfaces are identified by the reference S followed by an arabic numeral successively from the image to the object end. The index of refraction of each lens element is given under the heading $N_D$. The dispersion of each lens element as measured by its Abbe number is given by $V_D$. EFL is the equivalent focal length of the lens and the semi-field angle is set forth. F/No. is the relative aperture of the lens, and the aperture stop is indicated in relation to a surface. The aspheric surfaces of the lens elements are in accordance with the coefficients set forth in the foregoing aspheric equation.

In the lenses of Tables I–III, the optical power of the cooling medium and CRT screen are zero. However, it will be noted that in the lens of Tables IV–VII, the interior surface of the CRT screen is convex, resulting in the contribution of optical power. Accordingly, in Tables IV–VII, the optical power of the CRT is included in the lens prescription.

TABLE I

| Lens | Surface | Surface Radii(mm) | Axial Distance Between Surfaces(mm) | $N_D$ | $V_D$ |
|---|---|---|---|---|---|
| L1 | S1 | 83.645 | | | |
|    |    |        | 6.200 | 1.492 | 57.1 |
|    | S2 | 313.189 | | | |
|    |    |        | 21.698 | | |
| L2 | S3 | −95.418 | | | |
|    |    |        | 6.000 | 1.492 | 57.1 |
|    | S4 | −85.851 | | | |
|    |    |        | 0.500 | | |
| L3 | S5 | 94.246 | | | |
|    |    |        | 22.500 | 1.517 | 64.2 |
|    | S6 | −66.661 | | | |
|    |    |        | 44.437 | | |
| L4 | S7 | −34.347 | | | |
|    |    |        | 2.000 | 1.492 | 57.1 |
|    | S8 | PLANO | | | | f/No. = 1:1.0 at infinity
EFL = 67.91 mm
FVD = 116.53 mm
Semi-Field Angle = 29.4°
Aperture Stop = 18.01 mm after surface 2
Aspheric Surfaces = S1, S3, S4, S7

| | S1 | S3 | S4 | S7 |
|---|---|---|---|---|
| D | −0.1306 × $10^{-5}$ | 0.2570 × $10^{-7}$ | 0.5337 × $10^{-6}$ | −0.8391 × $10^{-5}$ |
| E | −0.1032 × $10^{-8}$ | −0.1528 × $10^{-9}$ | −0.2943 × $10^{-9}$ | 0.2263 × $10^{-7}$ |
| F | 0.4428 × $10^{-12}$ | 0.1220 × $10^{-13}$ | 0.5879 × $10^{-12}$ | −0.2779 × $10^{-10}$ |
| G | −0.5432 × $10^{-15}$ | −0.3139 × $10^{-15}$ | −0.5148 × $10^{-15}$ | 0.1374 × $10^{-13}$ |
| H | 0.4663 × $10^{-18}$ | −0.4321 × $10^{-19}$ | 0.7578 × $10^{-19}$ | 0.2312 × $10^{-17}$ |
| I | −0.1984 × $10^{-21}$ | 0.2879 × $10^{-21}$ | 0.2282 × $10^{-21}$ | −0.1497 × $10^{-20}$ |
| K | 1.326 | 0.01 | 0.01 | 0.01 |

TABLE II

| Lens | Surface | Surface Radii(mm) | Axial Distance Between Surfaces(mm) | $N_D$ | $V_D$ |
|---|---|---|---|---|---|
| L1 | S1 | 75.460 | | | |
|    |    |        | 8.000 | 1.492 | 57.1 |
|    | S2 | 117.428 | | | |
|    |    |        | 29.197 | | |
| L2 | S3 | −57.367 | | | |
|    |    |        | 5.500 | 1.492 | 57.1 |
|    | S4 | −88.787 | | | |
|    |    |        | 0.500 | | |
| L3 | S5 | 54.965 | | | |
|    |    |        | 24.500 | 1.517 | 64.2 |
|    | S6 | −380.635 | | | |
|    |    |        | 3.387 | | |
| L4 | S7 | 132.636 | | | |
|    |    |        | 10.000 | 1.492 | 57.1 |
|    | S8 | −160.230 | | | |
|    |    |        | 38.628 | | |
| L5 | S9 | −35.186 | | | |
|    |    |        | 2.000 | 1.492 | 57.1 |
|    | S10 | PLANO | | | | f/No. = 1:1.0 at infinity
EFL = 77.924 mm
FVD = 139.880 mm
Semi-Field Angle = 32.9°
Aperture Stop = 8.25 mm after surface 3
Aspheric Surfaces = S2, S4, S7, S8, S9

| | S2 | S4 | S7 |
|---|---|---|---|
| D | 0.2927 × $10^{-6}$ | −0.1624 × $10^{-7}$ | 0.6845 × $10^{-7}$ |
| E | −0.6863 × $10^{-10}$ | 0.1590 × $10^{-9}$ | −0.1190 × $10^{-9}$ |
| F | 0.9849 × $10^{-14}$ | 0.1198 × $10^{-13}$ | 0.5780 × $10^{-13}$ |
| G | 0.4401 × $10^{-16}$ | −0.9038 × $10^{-16}$ | 0.1194 × $10^{-16}$ |
| H | −0.9027 × $10^{-19}$ | 0.7838 × $10^{-19}$ | −0.4058 × $10^{-19}$ |
| I | 0.2604 × $10^{-22}$ | −0.2252 × $10^{-22}$ | −0.2035 × $10^{-22}$ |
| K | | −1.00 | |

| | S8 | S9 |
|---|---|---|
| D | 0.1314 × $10^{-5}$ | −0.2348 × $10^{-5}$ |
| E | 0.3353 × $10^{-9}$ | 0.4829 × $10^{-8}$ |
| F | −0.1950 × $10^{-12}$ | −0.6467 × $10^{-11}$ |
| G | 0.2161 × $10^{-15}$ | 0.3178 × $10^{-14}$ |
| H | −0.1360 × $10^{-19}$ | 0.1046 × $10^{-17}$ |
| I | −0.4671 × $10^{-22}$ | −0.9570 × $10^{-21}$ |
| K | 0.01 | 0.01 |

TABLE III

| Lens | Surface | Surface Radii(mm) | Axial Distance Between Surfaces(mm) | $N_D$ | $V_D$ |
|---|---|---|---|---|---|
| L1 | S1 | 83.111 | | | |
|    |    |        | 8.000 | 1.492 | 57.1 |
|    | S2 | 128.317 | | | |
|    |    |        | 31.413 | | |
| L2 | S3 | −56.939 | | | |
|    |    |        | 7.000 | 1.492 | 57.1 |
|    | S4 | −71.776 | | | |
|    |    |        | 0.500 | | |
| L3 | S5 | 53.181 | | | |
|    |    |        | 21.000 | 1.517 | 64.2 |
|    | S6 | 1904.008 | | | |
|    |    |        | 8.250 | | |
| L4 | S7 | 123.907 | | | |
|    |    |        | 9.000 | 1.492 | 57.1 |
|    | S8 | −163.606 | | | |

TABLE III-continued

|  |  | 36.926 |  |  |
|---|---|---|---|---|
|  | S9 | -34.780 |  |  |
| L5 |  |  | 2.000 | 1.492 | 57.1 |
|  | S10 | PLANO |  |  | f/No. = 1:1.0 at infinity
EFL = 77.973 mm
FVD = 142.258 mm
Semi-Field Angle = 33.0°
Aperture Stop = 10.50 mm after surface 3
Aspheric Surfaces = S2, S4, S8, S9

|  | S2 | S4 |
|---|---|---|
| D | $0.3419 \times 10^{-6}$ | $-0.1526 \times 10^{-6}$ |
| E | $-0.6711 \times 10^{-10}$ | $0.2051 \times 10^{-11}$ |
| F | $0.4795 \times 10^{-13}$ | $0.8352 \times 10^{-13}$ |
| G | $-0.4185 \times 10^{-16}$ | $-0.3699 \times 10^{-16}$ |
| K |  | $-1.00$ |

|  | S8 | S9 |
|---|---|---|
| D | $0.9403 \times 10^{-6}$ | $-0.3065 \times 10^{-5}$ |
| E | $0.6194 \times 10^{-9}$ | $0.6091 \times 10^{-8}$ |
| F | $-0.2664 \times 10^{-12}$ | $-0.6773 \times 10^{-11}$ |
| G | $0.1667 \times 10^{-15}$ | $0.3125 \times 10^{-14}$ |
| K | 0.01 | 0.01 |

TABLE IV

| Lens | Surface | Surface Radii(mm) | Axial Distance Between Surfaces(mm) | $N_D$ | $V_D$ |
|---|---|---|---|---|---|
| L1 | S1 | 70.923 | | | |
|  | S2 | 149.223 | 7.000 | 1.492 | 57.1 |
|  |  |  | 11.287 | | |
| L2 | S3 | -48.366 | 6.000 | 1.492 | 57.1 |
|  | S4 | -54.421 | | | |
|  |  |  | 0.630 | | |
| L3 | S5 | 56.452 | 20.000 | 1.517 | 64.2 |
|  | S6 | -122.416 | | | |
|  |  |  | 20.400 | | |
| L4 | S7 | -528.353 | 7.000 | 1.492 | 57.1 |
|  | S8 | -92.237 | | | |
|  |  |  | 18.690 | | |
| L5 | S9 | -34.045 | 4.000 | 1.517 | 64.2 |
|  | S10 | -42.500 | | | |
|  |  |  | 1.940 | 1.412 | 50.0 |
| L6 | S11 | PLANO | | | |
| L7 |  |  | 12.700 | 1.527 | 50.0 |
|  | S12 | -500.000 | | | | f/No. = 1:1.0 at infinity
EFL = 65.714 mm
FVD = 109.646 mm
Semi-Field Angle = 37.8°
Aperture Stop = 4.00 mm after surface 5
Aspheric Surfaces = S1, S2, S3, S4, S7, S8, S12

|  | S1 | S2 | S3 |
|---|---|---|---|
| D | $-0.2094 \times 10^{-5}$ | $-0.1809 \times 10^{-5}$ | $0.1837 \times 10^{-5}$ |
| E | $-0.1601 \times 10^{-8}$ | $-0.1532 \times 10^{-8}$ | $0.5452 \times 10^{-9}$ |
| F | $-0.4057 \times 10^{-12}$ | $-0.5851 \times 10^{-12}$ | $0.1441 \times 10^{-12}$ |
| G | $0.6501 \times 10^{-15}$ | $0.1435 \times 10^{-14}$ | $-0.3674 \times 10^{-15}$ |
| H | $0.5940 \times 10^{-18}$ | $-0.1322 \times 10^{-17}$ | $0.1885 \times 10^{-18}$ |
| I | $-0.2167 \times 10^{-21}$ | $0.7946 \times 10^{-21}$ | $-0.5718 \times 10^{-22}$ |

|  | S4 | S7 |
|---|---|---|
| D | $0.1295 \times 10^{-5}$ | $-0.5413 \times 10^{-6}$ |
| E | $0.3826 \times 10^{-9}$ | $-0.2915 \times 10^{-8}$ |
| F | $-0.3176 \times 10^{-12}$ | $-0.1622 \times 10^{-11}$ |
| G | $-0.2475 \times 10^{-15}$ | $-0.2339 \times 10^{-15}$ |
| H | $0.2419 \times 10^{-18}$ | $0.2514 \times 10^{-17}$ |
| I | $-0.1029 \times 10^{-21}$ | $-0.6678 \times 10^{-22}$ |
| K | $-1.00$ | |

|  | S8 | S12 |
|---|---|---|
| D | $0.8753 \times 10^{-6}$ | $-0.1233 \times 10^{-5}$ |
| E | $-0.6176 \times 10^{-9}$ | $0.5939 \times 10^{-9}$ |
| F | $-0.3377 \times 10^{-11}$ | $-0.9726 \times 10^{-13}$ |

TABLE IV-continued

| G | $0.1620 \times 10^{-14}$ | $0.4616 \times 10^{-17}$ |
| H | $-0.2098 \times 10^{-19}$ | |
| I | $0.1452 \times 10^{-20}$ | |
| K | 0.01 | |

TABLE V

| Lens | Surface | Surface Radii(mm) | Axial Distance Between Surfaces(mm) | $N_D$ | $V_D$ |
|---|---|---|---|---|---|
| L1 | S1 | 53.327 | 7.778 | 1.492 | 57.1 |
|  | S2 | 138.425 | | | |
|  |  |  | 6.197 | | |
| L2 | S3 | -50.009 | 5.556 | 1.492 | 57.1 |
|  | S4 | -77.176 | | | |
|  |  |  | 0.484 | | |
| L3 | S5 | 53.100 | 15.507 | 1.542 | 61.1 |
|  | S6 | -83.602 | | | |
|  |  |  | 13.899 | | |
| L4 | S7 | -117.679 | 7.778 | 1.492 | 57.1 |
|  | S8 | -54.614 | | | |
|  |  |  | 20.193 | | |
| L5 | S9 | -30.320 | 6.000 | 1.527 | 50.0 |
|  | S10 | -47.222 | | | |
| L6 | S11 | -350.000 | 5.000 | 1.412 | 50.0 |
| L7 |  |  | 6.000 | 1.527 | 50.0 |
|  | S12 | -350.000 | | | | f/No. = 1:1.0 at infinity
EFL = 56.397 mm
FVD = 94.391 mm
Semi-field Angle = 43.9°
Aperture Stop = 0.00 mm after surface 4
Aspheric Surfaces = S1, S2, S3, S4, S7, S8, S9

|  | S1 | S2 | S5 |
|---|---|---|---|
| D | $-0.3072 \times 10^{-5}$ | $-0.4220 \times 10^{-5}$ | $0.4010 \times 10^{-5}$ |
| E | $-0.4500 \times 10^{-8}$ | $-0.4618 \times 10^{-8}$ | $-0.7677 \times 10^{-10}$ |
| F | $-0.2493 \times 10^{-11}$ | $0.1231 \times 10^{-11}$ | $-0.5307 \times 10^{-12}$ |
| G | $0.1564 \times 10^{-14}$ | $0.2687 \times 10^{-14}$ | $-0.4079 \times 10^{-15}$ |
| H | $0.1921 \times 10^{-17}$ | $0.8029 \times 10^{-18}$ | $0.8889 \times 10^{-19}$ |
| I | $-0.2267 \times 10^{-21}$ | $-0.8214 \times 10^{-21}$ | $0.3495 \times 10^{-21}$ |

|  | S4 | S7 |
|---|---|---|
| D | $0.5604 \times 10^{-5}$ | $-0.2685 \times 10^{-5}$ |
| E | $0.9357 \times 10^{-9}$ | $0.4095 \times 10^{-8}$ |
| F | $-0.2048 \times 10^{-11}$ | $-0.1118 \times 10^{-10}$ |
| G | $-0.1806 \times 10^{-14}$ | $0.6657 \times 10^{-14}$ |
| H | $-0.7616 \times 10^{-19}$ | $0.1994 \times 10^{-16}$ |
| I | $0.2017 \times 10^{-20}$ | $-0.1745 \times 10^{-19}$ |
| K | $-1.00$ | |

|  | S8 | S9 |
|---|---|---|
| D | $0.6001 \times 10^{-6}$ | $-0.6225 \times 10^{-5}$ |
| E | $0.2433 \times 10^{-8}$ | $0.9927 \times 10^{-8}$ |
| F | $-0.4362 \times 10^{-12}$ | $0.1517 \times 10^{-12}$ |
| G | $0.2693 \times 10^{-15}$ | $-0.6698 \times 10^{-14}$ |
| H | $0.3526 \times 10^{-17}$ | $-0.2089 \times 10^{-17}$ |
| I | $0.1715 \times 10^{-20}$ | $0.2064 \times 10^{-20}$ |
| K | 0.01 | |

TABLE VI

| Lens | Surface | Surface Radii(mm) | Axial Distance Between Surfaces(mm) | $N_D$ | $V_D$ |
|---|---|---|---|---|---|
| L1 | S1 | 48.829 | 7.000 | 1.492 | 57.1 |
|  | S2 | 116.974 | | | |
|  |  |  | 4.477 | | |
| L2 | S3 | -46.309 | 6.000 | 1.492 | 57.1 |
|  | S4 | -75.814 | | | |
|  |  |  | 0.531 | | |
| L3 | S5 | 49.712 | 13.956 | 1.589 | 61.3 |

TABLE VI-continued

| | | | | | |
|---|---|---|---|---|---|
| | S6 | −92.068 | | | |
| | | | 13.438 | | |
| | S7 | −152.677 | | | |
| L4 | | | 7.000 | 1.492 | 57.1 |
| | S8 | −50.458 | | | |
| | | | 16.088 | | |
| | S9 | −26.700 | | | |
| L5 | | | 4.000 | 1.517 | 64.2 |
| | S10 | −42.500 | | | |
| L6 | | | 1.940 | 1.412 | 50.0 |
| | S11 | PLANO | | | |
| L7 | | | 12.700 | 1.527 | 50.0 |
| | S12 | −350.000 | | | | f/No. = 1:1.0 at infinity
EFL = 52.316 mm
FVD = 87.130 mm
Semi-Field Angle = 43.5°
Aperture Stop = 2.79 mm after surface 5
Aspheric Surfaces = S1, S2, S3, S4, S7, S8

| | S1 | S2 | S3 |
|---|---|---|---|
| D | −0.4415 × 10$^{-5}$ | −0.6248 × 10$^{-5}$ | 0.5296 × 10$^{-5}$ |
| E | −0.7080 × 10$^{-8}$ | −0.7671 × 10$^{-8}$ | −0.2697 × 10$^{-9}$ |
| F | −0.4775 × 10$^{-11}$ | 0.2534 × 10$^{-11}$ | −0.9926 × 10$^{-12}$ |
| G | 0.3735 × 10$^{-14}$ | 0.6306 × 10$^{-14}$ | −0.8221 × 10$^{-15}$ |
| H | 0.5048 × 10$^{-17}$ | 0.1267 × 10$^{-17}$ | 0.3187 × 10$^{-18}$ |
| I | −0.2692 × 10$^{-20}$ | −0.5136 × 10$^{-20}$ | 0.4292 × 10$^{-21}$ |

| | S4 | S7 | S8 |
|---|---|---|---|
| D | 0.7332 × 10$^{-5}$ | −0.3003 × 10$^{-5}$ | 0.6215 × 10$^{-6}$ |
| E | 0.1898 × 10$^{-8}$ | 0.5538 × 10$^{-8}$ | 0.4076 × 10$^{-8}$ |
| F | −0.3766 × 10$^{-11}$ | −0.2060 × 10$^{-10}$ | −0.1625 × 10$^{-11}$ |
| G | −0.4147 × 10$^{-14}$ | 0.1968 × 10$^{-13}$ | 0.2700 × 10$^{-14}$ |
| H | −0.3303 × 10$^{-18}$ | 0.6235 × 10$^{-16}$ | 0.1292 × 10$^{-16}$ |
| I | 0.6676 × 10$^{-20}$ | −0.6921 × 10$^{-19}$ | 0.6352 × 10$^{-20}$ |
| K | −1.00 | | 0.01 |

TABLE VII

| Lens | Surface | Radii(mm) | Axial Distance Between Surfaces(mm) | $N_D$ | $V_D$ |
|---|---|---|---|---|---|
| L1 | S1 | 52.933 | | | |
| | | | 7.700 | 1.492 | 57.1 |
| | S2 | 98.140 | | | |
| | | | 5.569 | | |
| L2 | S3 | −65.901 | | | |
| | | | 5.500 | 1.492 | 57.1 |
| | S4 | −113.517 | | | |
| | | | 0.098 | | |
| L3 | S5 | 54.790 | | | |
| | | | 7.000 | 1.589 | 61.3 |
| | S6 | 123.758 | | | |
| | | | 0.880 | | |
| L4 | S7 | 95.292 | | | |
| | | | 11.000 | 1.589 | 61.3 |
| | S8 | −99.491 | | | |
| | | | 14.405 | | |
| L5 | S9 | −97.613 | | | |
| | | | 7.700 | 1.492 | 57.1 |
| | S10 | −50.253 | | | |
| | | | 18.735 | | |
| L6 | S11 | −29.649 | | | |
| | | | 6.000 | 1.527 | 50.0 |
| | S12 | −38.521 | | | |
| L7 | | | 5.000 | 1.412 | 50.0 |
| | S13 | −350.000 | | | |
| L8 | | | 6.000 | 1.527 | 50.0 |
| | S14 | −350.000 | | | | f/No. = 1:1.0 at infinity
EFL = 56.427 mm
FVD = 95.587 mm
Semi-Field Angle = 44.0°
Aperture Stop = 1.40 mm after surface 5
Aspheric Surfaces = S1, S2, S3, S4, S9, S10

| | S1 | S2 | S3 |
|---|---|---|---|
| D | −0.3695 × 10$^{-5}$ | −0.4269 × 10$^{-5}$ | 0.3864 × 10$^{-5}$ |
| E | −0.5293 × 10$^{-8}$ | −0.4995 × 10$^{-8}$ | 0.9202 × 10$^{-11}$ |
| F | −0.2771 × 10$^{-11}$ | 0.1199 × 10$^{-11}$ | 0.9401 × 10$^{-13}$ |
| G | 0.1523 × 10$^{-14}$ | 0.2761 × 10$^{-14}$ | −0.8897 × 10$^{-16}$ |

TABLE VII-continued

| | | | |
|---|---|---|---|
| H | 0.1983 × 10$^{-17}$ | 0.5775 × 10$^{-18}$ | −0.1929 × 10$^{-18}$ |
| I | −0.2673 × 10$^{-21}$ | −0.1528 × 10$^{-20}$ | −0.5911 × 10$^{-21}$ |

| | S4 | S9 | S10 |
|---|---|---|---|
| D | 0.4943 × 10$^{-5}$ | −0.2987 × 10$^{-5}$ | 0.1387 × 10$^{-5}$ |
| E | 0.1064 × 10$^{-8}$ | 0.9284 × 10$^{-9}$ | −0.1133 × 10$^{-8}$ |
| F | −0.2424 × 10$^{-11}$ | −0.1053 × 10$^{-10}$ | 0.1706 × 10$^{-11}$ |
| G | −0.1442 × 10$^{-14}$ | 0.1014 × 10$^{-13}$ | 0.2638 × 10$^{-14}$ |
| H | 0.1528 × 10$^{-17}$ | 0.2234 × 10$^{-16}$ | 0.2175 × 10$^{-17}$ |
| I | 0.2049 × 10$^{-21}$ | −0.2144 × 10$^{-19}$ | 0.6418 × 10$^{-21}$ |
| K | −1.00 | | 0.01 |

TABLE VIII

| Lens | Surface Radii(mm) | Axial Distance Between Surfaces(mm) | $N_D$ | $V_D$ |
|---|---|---|---|---|
| L1 | S1 89.286 | | | |
| | | 13.465 | 1.492 | 57.1 |
| | S2 128.606 | | | |
| | | 42.130 | | |
| L2 | S3 79.674 | | | |
| | | 25.000 | 1.589 | 61.3 |
| | S4 −196.859 | | | |
| | | 0.129 | | |
| L3 | S5 140.851 | | | |
| | | 9.618 | 1.492 | 57.1 |
| | S6 102.345 | | | |
| | | 17.426 | | |
| L4 | S7 2062.610 | | | |
| | | 13.465 | 1.492 | 57.1 |
| | S8 −591.273 | | | |
| | | 34.784 | | |
| L5 | S9 −45.510 | | | |
| | | 6.000 | 1.527 | 50.0 |
| | S10 −52.168 | | | |
| C | | 7.000 | 1.412 | 50.1 |
| | S11 PLANO | | | | f/No. = 1:1.0 at affinity
EFL = 98.82 mm
FVD = 176.02 mm
Semi-Field Angle = 31.57°
Aperture Stop = 33.70 mm after surface 2
Aspheric Surfaces = S1, S2, S5, S6, S7, S8

| | S1 | S2 | S5 |
|---|---|---|---|
| D | −0.4429 × 10$^{-6}$ | −0.1855 × 10$^{-6}$ | 0.4228 × 10$^{-7}$ |
| E | −0.2200 × 10$^{-9}$ | −0.2640 × 10$^{-9}$ | −0.3414 × 10$^{-9}$ |
| F | −0.3848 × 10$^{-13}$ | −0.1504 × 10$^{-13}$ | 0.3820 × 10$^{-13}$ |
| G | 0.4231 × 10$^{-17}$ | 0.1099 × 10$^{-16}$ | 0.2441 × 10$^{-16}$ |
| H | 0.1711 × 10$^{-20}$ | 0.8605 × 10$^{-21}$ | −0.2225 × 10$^{-21}$ |
| I | 0.9494 × 10$^{-25}$ | 0.5953 × 10$^{-26}$ | −0.5386 × 10$^{-23}$ |
| K | | | −1.00 |

| | S6 | S7 | S8 |
|---|---|---|---|
| D | 0.2867 × 10$^{-6}$ | −0.2380 × 10$^{-6}$ | 0.6554 × 10$^{-7}$ |
| E | −0.2947 × 10$^{-9}$ | −0.4064 × 10$^{-9}$ | −0.1887 × 10$^{-9}$ |
| F | −0.6147 × 10$^{-14}$ | −0.1984 × 10$^{-12}$ | −0.2269 × 10$^{-12}$ |
| G | 0.3124 × 10$^{-16}$ | 0.8141 × 10$^{-16}$ | 0.3254 × 10$^{-16}$ |
| H | 0.8326 × 10$^{-20}$ | 0.4930 × 10$^{-19}$ | 0.5569 × 10$^{-19}$ |
| I | −0.3545 × 10$^{-23}$ | −0.1849 × 10$^{-23}$ | −0.9428 × 10$^{-23}$ |
| K | | | 0.01 |

Table IX sets forth the powers $K_1$, $K_2$, $K_3$, and $K_{CR}$ of the lens units G1, G2, G3, and CR as a function of the power $K_0$ of the overall lens as calculated by the radii on the optical axis.

TABLE IX

| Lens | $K_1/K_0$ | $K_2/K_0$ | $|K_3/K_0|$ | $K_{CR}/K_0$ |
|---|---|---|---|---|
| TABLE I | .331 | .859 | .976 | — |
| TABLE II | −.0098 | 1.234 | 1.093 | — |
| TABLE III | .061 | 1.154 | 1.106 | — |
| TABLE IV | .191 | .845 | .745 | .290 |
| TABLE V | .155 | .903 | .755 | .284 |
| TABLE VI | .123 | .923 | .782 | .350 |
| TABLE VII | .094 | .973 | .744 | .283 |

TABLE IX-continued

| Lens | $K_1/K_0$ | $K_2/K_0$ | $|K_3/K_0|$ | $K_{CR}/K_0$ |
|---|---|---|---|---|
| TABLE VIII | .186 | .996 | .917 | .010 |

Table X sets forth various lens spacings and other relationships. $D_{12}/F_3$ is the ratio of the axial distance between element L1 and lens unit G2 to the focal length of the field flattener $F_3$. $F_0$ is the EFL of the lens. $D_{2C}$ is the distance from lens unit G2 to corrector lens unit CR. 2H/CA is the ratio of the height H at which the marginal axial rays intersect the image side surface of corrector lens unit CR.

TABLE X

| Lens | $|D_{12}/F_3|$ | $D_{12}/F_0$ | $D_{2C}/F_0$ | Unit C 2H/CA |
|---|---|---|---|---|
| TABLE I | .403 | .415 | — | — |
| TABLE II | .494 | .452 | — | — |
| TABLE III | .552 | .499 | — | — |
| TABLE IV | .197 | .265 | .312 | .651 |
| TABLE V | .164 | .217 | .246 | .743 |
| TABLE VI | .165 | .210 | .257 | .800 |
| TABLE VII | .147 | .198 | .255 | .6671 |
| TABLE VIII | .391 | .426 | .186 | .665 |

The spacing $D_{12}$ as a ratio to the equivalent focal length $F_3$ of the third lens unit should be $$0.6 > D_{12}/F_3 > 0.1$$

for the reasons previously set forth.

Table XI sets forth the ratio of the powers $K_{L1}$ and $K_{L2}$ of elements L1 and L2 of the lenses of Tables I–VII, respectively, to the overall power $K_0$ of the lens and also the absolute ratio to each other, and $K_{L1}$ and $K_{L2}$ of the lenses of Table VIII.

TABLE XI

| Lens | $K_{L1}/K_O$ | $K_{L2}/K_O$ | $K_L^3/K_O$ |
|---|---|---|---|
| TABLE I | .296 | .047 | — |
| TABLE II | .194 | .224 | — |
| TABLE III | .173 | −.118 | — |
| TABLE IV | .246 | .050 | — |
| TABLE V | .331 | .183 | — |
| TABLE VI | .319 | .202 | — |
| TABLE VII | .256 | .171 | — |
| TABLE VIII | .181 | — | −.120 |

From Tables IX and XI, it can be seen that while the power of the front element L1 is rather weak $$K_{L1}/K_0 < 0.36$$

the powers of each of the individual elements L1, L2 and CR are also kept low $$K_{L1}/K_0 < 0.4$$

$$|K_{L2}/K_0| < 0.3$$

$$K_{CR}/K_0 < 0.4$$

It is preferred to hold these powers to low values so that the focus shift and the image quality degradation are reduced to acceptable levels.

Corrector lens unit CR may be considered part of lens unit G2 even though it is spaced from the biconvex element a greater distance than disclosed in U.S. Pat. No. 4,348,081.

Another important characteristic of these elements is shown in Table XII where Tmin and Tmax are minimum and maximum thicknesses of these elements, respectively, as they change parallel to the optical axis along the diameter of the element.

TABLE XII

| Lens | Tmax/Tmin | | | |
|---|---|---|---|---|
|  | L1 | L2 | L3 | CR |
| TABLE I | 1.7 | 1.1 | — | — |
| TABLE II | 2.0 | 2.2 | — | — |
| TABLE III | 1.6 | 1.7 | — | — |
| TABLE IV | 1.8 | 1.3 | — | 1.4 |
| TABLE V | 2.2 | 1.8 | — | 1.3 |
| TABLE VI | 2.3 | 1.7 | — | 1.8 |
| TABLE VII | 1.6 | 1.6 | — | 1.3 |
| TABLE VIII | 1.3 | — | 1.4 | 1.1 |

Because of the low powers of elements L1, L2 and CR, it is possible to maintain the ratio $$Tmax/Tmin < 2.5.$$

This means that these elements are very suitable for manufacturing, using conventional injection molding technology. This manufacturing technique can give excellent results at very low cost if lenses to be molded have as small a variation of thickness as possible. This is due to more uniform cooling of molded parts and smaller deformations caused by non-uniform shrinkage of the plastic lens as it is cooled.

From the foregoing tables, particularly Table IX, it will be noted that when the CRT faceplate is planar, more power is required in the field flattening element of lens unit G3. This is evidenced by the lenses of FIGS. 1 and 2 and Tables I, II, III, and VIII having a power $|K_3/K_0|$ in the third lens group G3 above 0.9, while in the lenses of Tables IV–VII $|K_3/K_0|$ does not exceed 0.8.

In the lenses of Tables IV–VIII, the corrector lens unit CR is positioned an axial distance from lens unit G2 as follows:

$$0.4 > D_{2C}/F_0 > 0.1$$

The corrector element concave to the biconvex power unit $K_{L2}$ in Tables I–VI and VIII and $K_{L4}$ in Table VII is of very weak optical power $K_M$ as shown by the data in Table XIII.

TABLE XIII

| LENS | $K_M$ | Rx/Rc |
|---|---|---|
| TABLE I | $K_{L2}/K_O =$ .047 | 1.09 |
| TABLE II | $K_{L2}/K_O =$ −.223 | .62 |
| TABLE III | $K_{L2}/K_O=$ −.118 | .74 |
| TABLE IV | $K_{L2}/K_O =$ −.050 | 1.13 |
| TABLE V | $K_{L2}/K_O =$ −.183 | 1.54 |
| TABLE VI | $K_{L2}/K_O =$ −.202 | 1.53 |
| TABLE VII | $K_{L3}/K_O =$ −.119 | 1.38 |
| TABLE VIII | $K_{L2}/K_O =$ −.170 | 1.73 |

The quantity Rx/Rc is the ratio of the radius of the convex surface to the concave surface of the correctors stated in Table XIII.

As seen by the prescriptions of Tables I–VIII, lenses embodying the invention may have semi-field angles of almost forty-four degrees, yet the front vertex distances may be less than one hundred millimeters. This is stated in relation to a CRT which would have a diagonal of 5.0 inches. This lens, as exemplified in Table VII is for a projection TV set with a screen diagonal of 40.4 inches.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus disclosed the invention, what is claimed is:

1. A projection lens for a cathode ray tube having a semi-field angle of essentially thirty degrees or greater which consists of a first lens unit of weak positive power, a second lens unit including a biconvex glass element, and a third lens unit having a strongly concave image side surface and which contributes to correction of field curvature, and a meniscus corrector lens element having at least one aspheric surface and positioned to said second lens unit less than 0.1 percent of the equivalent focal length of the lens and having a surface convex to said second lens unit and contributing to correction of oblique spherical aberration, said meniscus corrector lens element having an axial optical power $$0.05 > K_M/K_0 > -0.23$$

where $K_M$ is the optical power of said meniscus lens elements at the optical axis and $K_0$ is the optical power of the overall lens.

2. The projection lens of claim 1 wherein said meniscus corrector lens element is on the image side of said second lens unit and forms part of said first lens unit.

3. The projection lens of claim 1 where said meniscus corrector lens element is on the object side of said second lens unit.

4. The projection lens system of claim 1 where said first meniscus element becomes concave to the image on its image side surface adjacent the clear aperture thereof.

5. The projection lens system of claim 2 wherein the optical power of said first lens unit is positive and $$0.20 > K_1/K_0 > 0.05$$

where $K_1$ is the combined power of said first and second meniscii of said first lens unit and $K_0$ is the overall power of the lens system.

6. The projection lens system of claim 1 further including a further corrector lens unit positioned between said second and third lens units and having at least one aspheric surface.

7. The projection lens of claim 6 where said further corrector lens unit is axially spaced from said second lens unit $$0.4 > D_{2C}/F_0 > 0.1$$

where $D_{2C}$ is the axial distance between said second lens unit and said corrector lens unit and $F_0$ is the equivalent focal length of the lens.

8. The projection lens system of claim 6 where said further corrector lens unit is an overall meniscus element concave to the image side.

9. The projection lens system of claim 8 where said meniscus element is positive.

10. A projection lens system having a semi-field angle of essentially thirty degrees or greater adapted to project an image from a cathode ray tube and consisting from the image end of
a first lens unit of weak optical power, a second lens unit of strong optical power and including a biconvex element, and
a third lens unit of strongly negative optical power having a concave image side surface and serving to provide correction for field curvature,
said first lens unit comprising a first meniscus shaped element having positive power at the optical axis having at least one aspheric surface and being convex to the image at the optical axis, and a second meniscus shaped element of weak optical power having at least one aspheric surface, said second element of said first lens unit being closely spaced to and convex to the second lens unit to contribute to correction of sagittal oblique spherical aberration.

11. The projection lens system of claim 10 where the cathode ray tube has a curved face plate and contributes optical power to said third lens unit.

12. The projection lens system of claim 10 where $$0.6 > D_{12}/F_3 > 0.1$$

where $D_{12}$ is the axial spacing between said first meniscus shaped element and said second lens unit and $F_3$ is the equivalent focal length of said third lens unit.

13. The projection lens system of claim 10 where said first meniscus element becomes concave to the image side on its image side surface adjacent the clear aperture of the image side surface of said first meniscus.

14. The projection lens system of claim 10 wherein the optical power of said first lens unit is positive and $$0.20 > K_1/K_0 > 0.05$$

where $K_1$ is the combined power of said first and second meniscii of said first lens unit and $K_0$ is the overall power of the lens system.

15. The projection lens system of claim 10 including a further corrector lens unit positioned between said second and third lens units and having at least one aspheric surface.

16. The projection lens of claim 15 where said corrector lens unit is axially spaced from said second lens unit $$0.4 > D_{2C}/F_0 > 0.1$$

where $D_{2C}$ is the axial distance between said second lens unit and said corrector lens unit and $F_0$ is the equivalent focal length of the lens.

17. The projection lens system of claim 15 where said further corrector lens unit is a meniscus element concave to the image side.

18. The projection lens system of claim 17 where said meniscus element is positive.

19. The projection lens system of claim 18 where said meniscus element is concave to the image side.

20. The projection lens of claim 10 where said second meniscus element is on the object side of said second lens unit.

21. The projection lens of claim 10 where said second meniscus is on the image side of said second lens unit.

22. A projection lens for a cathode ray tube having a semi-field angle of essentially thirty degrees or greater which consists of a first lens unit of weak positive power, a second lens unit including a biconvex glass element, and a third lens unit having a strongly biconcave surface and which contributes to correction of field curvature, and a meniscus corrector lens unit having at least one aspheric surface closely positioned to said second lens unit and having a surface convex to said second lens unit, said corrector lens unit being of meniscus form and of weak optical power, said first lens unit and said corrector lens unit each consisting of a single plastic element having at least one aspheric surface, and $$Tmax/Tmin < 2.5$$

where Tmax is the maximum thickness of said plastic elements parallel to the optical axis of the lens and Tmin is the minimum thickness of said plastic elements parallel to the optical axis of said lens, and an additional plastic corrector element having at least one aspheric surface positioned between said second lens unit and said third lens unit.

23. The projection lens of claim 22 where said additional plastic corrector element also satisfies the condition $$Tmax/Tmin < 2.5$$

24. A projection lens for a cathode ray tube having a semi-field angle of essentially thirty degrees or greater which consists of a first lens unit of weak positive power, a second lens unit including a biconvex glass element, and a third lens unit having a strongly concave image side surface and which contributes to correction of field curvature, said first lens unit including a first meniscus element having at least one aspheric surface and a further meniscus corrector lens element having at least one aspheric surface and being closely positioned to said second lens unit on the image side thereof and having a surface convex to said second lens unit, said first lens unit having an optical power $$0.20 > K_1/K_0 > 0.05$$

where $K_1$ is the combined power of said first and second meniscii of said first lens unit and $K_0$ is the overall power of the lens system.

25. The projection lens of claim 24 where said first meniscus element is convex to the image side at the optical axis and becomes concave to the image side adjacent its clear aperture.

26. The projection lens of claim 24 where said second lens unit consists of a biconvex element and another element which is of positive power at the optical axis, said biconvex element having spherical surfaces.

27. The projection lens of claim 24 where $$0.6 > D_{12}/F_3 > 0.1$$

where $D_{12}$ is the axial spacing between said first meniscus shaped element and said second lens unit and $F_3$ is the equivalent focal length of said third lens unit.

28. The projection lens of claim 24 where said second lens unit consists of two elements.

29. The projection lens of claim 28 where said elements of said second lens unit have spherical surfaces.

30. The projection lens of claim 24 where the surfaces of said second lens element are spherical.

31. A projection lens for a cathode ray tube having a semi-field angle of essentially thirty degrees or greater which consists of a first lens unit of weak positive power including a first meniscus element convex to the image side, a second lens unit including a biconvex glass element, and a third lens unit having a strongly concave image side surface and which contributes to correction of field curvature, a corrector lens element of meniscus form of weak optical power having at least one aspheric surface and closely positioned to said second lens unit and having a surface convex to said second lens unit, and a further corrector lens unit positioned between said second and third lens units and having at least one aspheric surface.

32. The projection lens of claim 31 wherein said corrector lens element is on the image side of said second lens unit and forms part of said first lens unit.

33. The projection lens of claim 31 where said corrector lens is on the object side of said second lens unit.

34. The projection lens system of claim 31 where said first meniscus element becomes concave to the image on its image side surface adjacent the clear aperture thereof.

35. The projection lens system of claim 32 wherein the optical power of said first lens unit is positive and $$0.20 > K_1/K_0 > 0.05$$

where $K_1$ is the combined power of said first and second meniscii of said first lens unit and $K_0$ is the overall power of the lens system.

36. The projection lens of claim 31 where said further corrector lens unit is axially spaced from said second lens unit $$0.4 > D_{2C}/F_0 > 0.1$$

where $D_{2C}$ is the axial distance between said second lens unit and said corrector lens unit and $F_0$ is the equivalent focal length of the lens.

37. The projection lens system of claim 31 where said further corrector lens unit is a meniscus element concave to the image side.

38. The projection lens system of claim 37 where said meniscus element is positive.

39. The projection lens of claim 31 where $$0.6 > D_{12}/F_3 > 0.1$$

where $D_{12}$ is the axial spacing between said first meniscus shaped element and said second lens unit and $F_3$ is the equivalent focal length of said third lens unit.

40. The projection lens of claim 31 where said second lens unit consists of two elements.

41. The projection lens of claim 40 where said elements of said second lens unit have spherical surfaces.

42. The projection lens of claim 31 where the surfaces of said second lens element are spherical.

* * * * *

UNITED STATES PATENT AND TRADEMARK OFFICE
CERTIFICATE OF CORRECTION

PATENT NO. : 4,682,862
DATED : July 28, 1987
INVENTOR(S) : Jacob Moskovich

It is certified that error appears in the above-identified patent and that said Letters Patent is hereby corrected as shown below:

Column 2, Line 54, change "issued" to -- filed --.

Column 5, Line 62, change "$0.12 < |D_{12}/F_3| < 0.6$" to

-- $0.6 > |D_{12}/F_3| > 0.1$ --.

Column 13, Line 28, change "$0.6 > D_{12}/F_3 > 0.1$" to

-- $0.6 > |D_{12}/F_3| > 0.1$ --.

IN THE CLAIMS

Column 16, Claim 12, change "$0.6 > D_{12}/F_3 > 0.1$" to

-- $0.6 > |D_{12}/F_3| > 0.1$ --.

Column 17, Claim 27, change "$0.6 > D_{12}/F_3 > 0.1$" to

-- $0.6 > |D_{12}/F_3| > 0.1$ --.

Column 18, Claim 39, change "$0.6 > D_{12}/F_3 > 0.1$ to

-- $0.6 > |D_{12}/F_3| > 0.1$ --.

Signed and Sealed this

Nineteenth Day of January, 1988

Attest:

DONALD J. QUIGG

Attesting Officer     Commissioner of Patents and Trademarks

(12) EX PARTE REEXAMINATION CERTIFICATE (5054th)
United States Patent
Moskovich

(10) Number: US 4,682,862 C1
(45) Certificate Issued: Jan. 25, 2005

(54) PROJECTION LENS

(75) Inventor: Jacob Moskovich, Cincinnati, OH (US)

(73) Assignee: 3M Innovative Properties Company, St. Paul, MN (US)

Reexamination Request:
No. 90/006,990, Apr. 2, 2004

Reexamination Certificate for:
Patent No.: 4,682,862
Issued: Jul. 28, 1987
Appl. No.: 06/899,477
Filed: Aug. 22, 1986

Certificate of Correction issued Jan. 19, 1988.

Related U.S. Application Data

(63) Continuation-in-part of application No. 06/820,553, filed on Jan. 17, 1986, now Pat. No. 4,685,774.

(51) Int. Cl.[7] ............ G02B 9/34; G02B 9/60; G02B 13/18; G02B 3/02; G02B 9/62
(52) U.S. Cl. ........ 359/649; 359/708; 359/756; 359/763; 359/771

(56) References Cited

U.S. PATENT DOCUMENTS

| | | | |
|---|---|---|---|
| 4,620,773 A | 11/1986 | Fukuda | 359/650 |
| 4,682,861 A | 7/1987 | Hosoya | 359/650 |
| 4,699,476 A | 10/1987 | Clarke | 359/650 |
| 4,810,075 A | 3/1989 | Fukuda | 359/650 |

*Primary Examiner*—Jordan Schwartz

(57) ABSTRACT

A projection lens system adapted to project an image from a cathode ray tube and consisting from the image end of a first lens unit of weak optical power, a second lens unit of strong optical power including a biconvex glass element, a third lens unit of strongly negative optical power having a convex image side surface and serving as a field flattener, the first lens unit consisting of a first meniscus shaped element having positive power at the optical axis having at least one aspheric surface and being convex to the image, and a second meniscus shaped element having at least one aspheric surface, the said second meniscus being convex to the second lens group and closely spaced thereto. The second meniscus may be on either side of the second lens unit and is of very weak optical power.

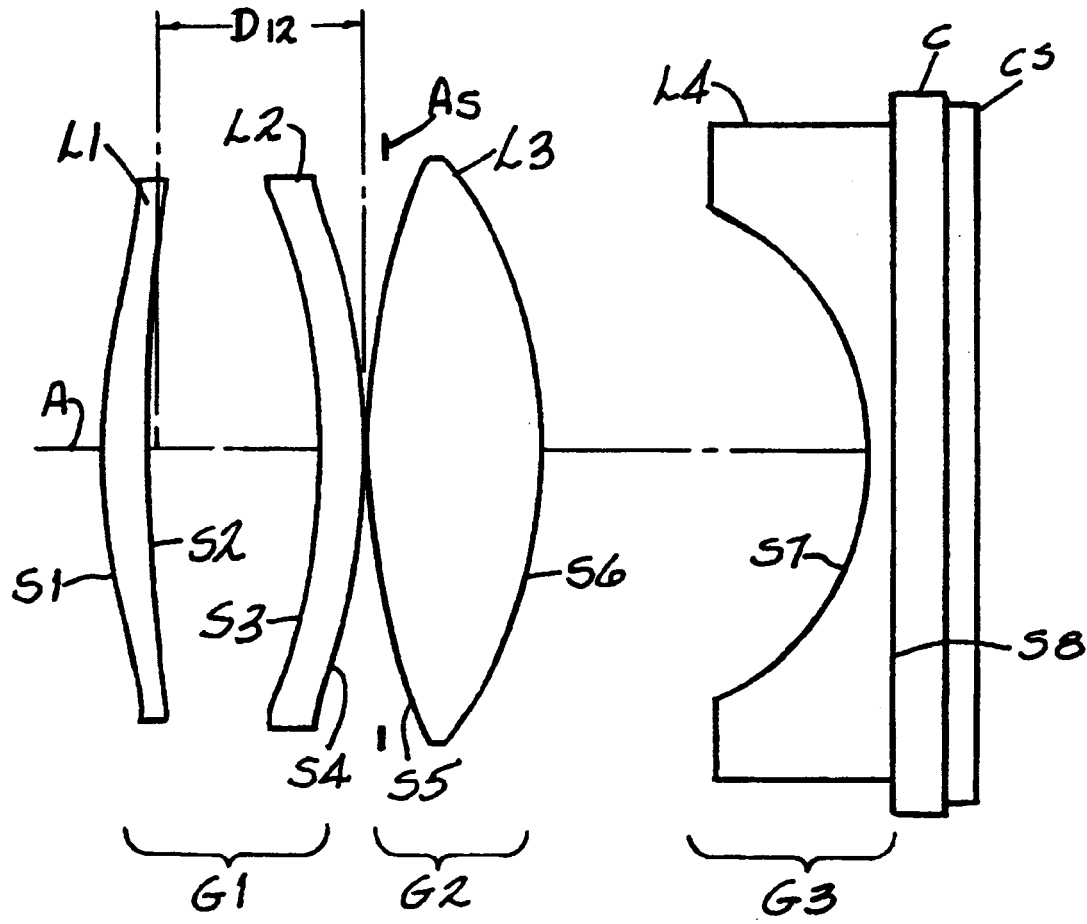

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–42 is confirmed.

\* \* \* \* \*